United States Patent
Alban et al.

(10) Patent No.: US 12,304,828 B2
(45) Date of Patent: May 20, 2025

(54) METHOD FOR TREATING AN INDUSTRIAL EFFLUENT CHARGED WITH ALUMINIUM USING $CO_2$

(71) Applicant: L'Air Liquide, Société Anonyme pour l'Etude et l'Exploitation des Procédés Georges Claude, Paris (FR)

(72) Inventors: Bruno Alban, Massy (FR); Dominique Bras, Massy (FR); Philippe Campo, Montigny le Bretonneux (FR)

(73) Assignee: L'Air Liquide, Société Anonyme pour l'Etude et Georges Claude, Paris (FR)

( * ) Notice: Subject to any disclaimer, the term of this patent is extended or adjusted under 35 U.S.C. 154(b) by 1069 days.

(21) Appl. No.: 16/972,474

(22) PCT Filed: May 29, 2019

(86) PCT No.: PCT/FR2019/051272
§ 371 (c)(1),
(2) Date: Dec. 4, 2020

(87) PCT Pub. No.: WO2019/234327
PCT Pub. Date: Dec. 12, 2019

(65) Prior Publication Data
US 2021/0163307 A1 Jun. 3, 2021

(30) Foreign Application Priority Data
Jun. 5, 2018 (FR) .................................. 1854871

(51) Int. Cl.
*C01F 7/14* (2022.01)
*C01F 7/142* (2022.01)
(Continued)

(52) U.S. Cl.
CPC ............ *C01F 7/142* (2013.01); *C02F 1/5209* (2013.01); *C02F 2101/20* (2013.01);
(Continued)

(58) Field of Classification Search
CPC .... C01F 7/142; C02F 1/5209; C02F 2101/20; C02F 2103/16; C02F 2209/06; C02F 2209/40
See application file for complete search history.

(56) References Cited

U.S. PATENT DOCUMENTS 4,492,682 A * 1/1985 Trebillon ................ C01F 7/142
423/625
5,800,797 A 9/1998 Matsumoto et al.
(Continued)

FOREIGN PATENT DOCUMENTS

CN 1752006 A 3/2006
CN 106745130 A 5/2017
(Continued)

OTHER PUBLICATIONS

Klein EP0792838A1 English Translation (Year: 1997).*
(Continued)

*Primary Examiner* — Timothy C Vanoy
(74) *Attorney, Agent, or Firm* — Yan Jiang

(57) ABSTRACT

A method for treatment of an industrial effluent with aluminum, comprising:
the effluent to be treated is carried to a first zone constituted by a tank having a pH of less than 9.5, so as to promote precipitation of the aluminum in aluminum hydroxide form and to facilitate its removal;
a second zone is available and the recirculation of a part of a medium located in the zone 1 to the zone 2 and then return to the zone 1, and the injection of gaseous $CO_2$ into the recirculated medium, are arranged;
the solid particles formed in the zone 1 are separated and discharged; wherein in view of the recirculation of the medium where $CO_2$ has been injected, the amount of dissolved $CO_2$ available in the zone 1 is 0.5 to 3 times
(Continued)

greater than the requirement necessary for the precipitation of the incoming effluent.

11 Claims, 1 Drawing Sheet

(51) Int. Cl.
*C02F 1/52* (2023.01)
*C02F 101/20* (2006.01)
*C02F 103/16* (2006.01)

(52) U.S. Cl.
CPC ...... *C02F 2103/16* (2013.01); *C02F 2209/06* (2013.01); *C02F 2209/40* (2013.01)

(56) References Cited

U.S. PATENT DOCUMENTS

| | | | | |
|---|---|---|---|---|
| 2003/0190281 | A1* | 10/2003 | Kudermann | C01F 7/142 423/629 |
| 2005/0167641 | A1 | 8/2005 | Chen et al. | |
| 2013/0068628 | A1 | 3/2013 | Ling et al. | |
| 2014/0356262 | A1* | 12/2014 | Ruth | C22B 21/0023 423/127 |

FOREIGN PATENT DOCUMENTS

| | | | | |
|---|---|---|---|---|
| CN | 109437266 A | | 3/2019 | |
| DE | 137 218 A | * | 8/1979 | ............. C01F 7/142 |
| DE | 41 07 287 A1 | * | 9/1992 | ............... C01F 7/77 |
| DE | 196 07 300 | | 8/1997 | |
| DE | 197 03 348 | | 8/1998 | |
| EP | 0 792 838 | | 9/1997 | |
| EP | 0792838 A1 | * | 9/1997 | |
| EP | 2 452 924 | | 5/2012 | |
| GB | 637 578 | | 5/1950 | |
| JP | 2001 104 737 A | * | 4/2001 | ........... B01J 20/041 |
| RU | 2200706 C2 | | 3/2003 | |
| RU | 2 612 288 C1 | * | 3/2017 | ............. C01F 7/142 |
| SU | 48272 | | 8/1936 | |
| SU | 1 320 174 A | * | 6/1987 | ............. C01F 1/142 |

OTHER PUBLICATIONS

Globalspec, Jet Pumps Selection Guide, 2016 (Year: 2016).*
Han et al. Journal of Hazardous Materials 2017, 326, 87-93 (Year: 2017).*
International Search Report for corresponding PCT/FR2019/051272, dated Oct. 17, 2018.

* cited by examiner

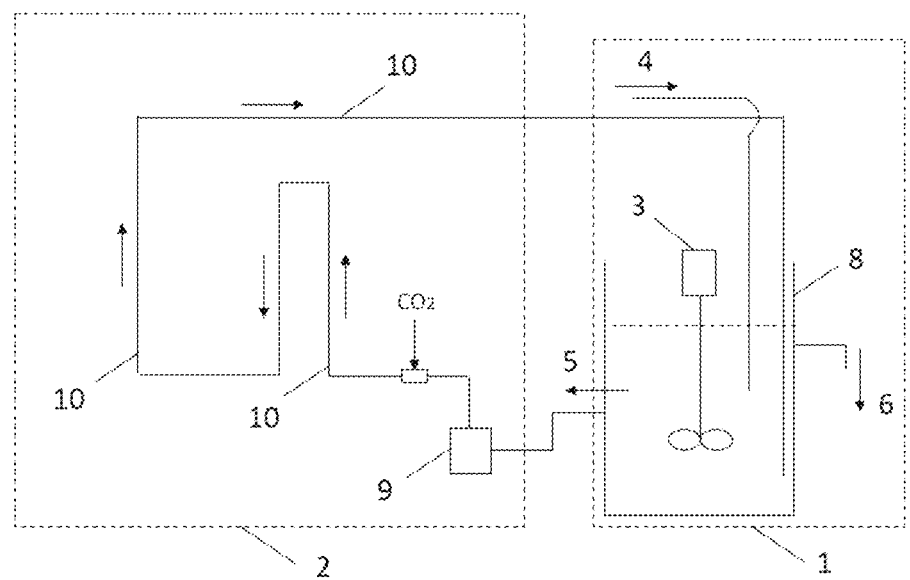

METHOD FOR TREATING AN INDUSTRIAL EFFLUENT CHARGED WITH ALUMINIUM USING $CO_2$

CROSS REFERENCE TO RELATED APPLICATIONS

This application is a 371 of International Application No. PCT/FR2019/051272, filed May 29, 2019, which claims priority to French Patent Application No. 1854871, filed Jun. 5, 2018, the entire contents of which are incorporated herein by reference.

BACKGROUND

The present invention relates to the field of the treatments of highly basified effluents laden with metals, including alkaline earth metals, for the purpose of neutralizing them and of significantly removing the metals present in the effluent. This problem is found in particular in the iron and steel industry, but other industries may be concerned and mention may in particular be made of the case of the treatment of the aqueous liquors resulting from the production of aluminum based on natural raw materials, such as bauxite (known as "red muds", which are very heavily laden with aluminum, among others).

With an addition of carbon dioxide gas, it is possible to neutralize this type of effluent and to cause the metals to precipitate in order to remove them. However, in the very great majority of cases, direct injection presents the problem of the complete or partial blocking of the injection systems and of losses in performance qualities of the installation. This is because, as the injection has the aim of neutralizing but also of precipitating the inorganic compounds, the formation of solids close to the injection points, the place where the $CO_2$ necessary for the precipitation is introduced, is inevitable. It is easily understood that, as a very high amount of solid, which can reach several tonnes per hour, can be formed in the vicinity of the injection points for the $CO_2$, these injection points can easily become blocked and can harm the performance qualities of installation.

The problem which this method presents is that the direct addition of the acid ($CO_2$) to a very basic body of water laden with metals brings about an instantaneous precipitation which is difficult to control. Numerous are the industrial cases reported where the injection and mixing sites, such as conduits, are very rapidly blocked.

Let us now consider, in what follows, the case of the treatment of the aqueous liquors resulting from the production of aluminum. It is then a question of neutralizing an aqueous liquid stream which contains a great deal of dissolved aluminum, which it is necessary to remove before discharging the aqueous liquors. In general, this effluent is highly basic and the aluminum is dissolved in the aluminate ($Al(OH)_4^-$) form. This is due to the treatment of the ore carried out with sodium hydroxide ("leaching").

The aluminum can be removed by adding $CO_2$ in order to convert the dissolved aluminate in a basic medium into aluminum hydroxide $Al(OH)_3$ which, being not very soluble, will have a tendency to precipitate. The pH of the effluent is reduced, or more precisely neutralized or partially neutralized, and, thus freed of aluminum, it will thus be purified. The working pH range for this operation is generally:

low, thus lower than that of the incoming effluent to be treated, but the pH cannot be too low (<5) as then the aluminum dissolves in the $Al^{3+}$ form.

To sum up, for the case of aluminum, an optimum working pH of typically between 5 and 8.5 is recommended.

Nevertheless, the dissolution of the $CO_2$ and the operation of bringing it into contact with the effluent laden with electrolytes is still difficult. This is because $CO_2$, like any strong acid, brings about a high concentration of acid at the place of the injection. In this highly acid zone, the formation of solid aluminum hydroxides is very great and the risk of plugging of the injection point is then very high.

In other words, in general, the effluent contains a great deal of aluminate which effectively requires a great deal of acid in order to bring about the precipitation and neutralization. Unfortunately, this operation proves to be difficult to carry out because:

the homogenization or the mixing of the effluent (liquid) and of the gas ($CO_2$) is not easy, that is to say not instantaneous. Consequently, the injection zone (whether an injector or a perforated tube, for example, is concerned), which forms the interface between effluent and gas, proves to very rapidly produce a great deal of precipitates, which cause blockages which are difficult to remove: shutdown and stripping with strong acid, for example.

Furthermore, the particles formed prove to be fairly resistant and can result, if they accumulate, in blockages in the portion downstream of the injection place.

Finally, the different stages (injection/transfer of the gas and contact of the dissolved $CO_2$ with the effluent which contains the aluminates) are often carried out in one and the same zone, one and the same appliance or conduit, whereas the conditions required for each stage are different.

Thus, to sum up, in view of the elements touched on above, the operation of injection of $CO_2$ combined with the precipitation can be very difficult to carry out, indeed even virtually impossible, and its application consequently abandoned by a person skilled in the art.

An example of treatment provided in this industry is described below:

a furring/scaling effluent, containing a great deal of dissolved aluminum to be removed. The high-pH effluent ($pH_1$ in the vicinity of 12) is sent to a tank which is maintained at a lower pH ($pH_2$ in the vicinity of 7-8.5) by injection of $CO_2$. This value is regarded as ideal for precipitating aluminum hydroxides.

the neutralized effluent with its solid exits via the bottom of the tank (pumped) in order to be subsequently separated by settling. At this stage, it is also possible to use a the addition of products (such as viscosifying agent, electrolyte, coagulant or surfactant, for example) in order to enlarge the size of the solid particles initially formed (by agglomeration, acceleration of the crystallization, and the like) in order to improve their "decantability" or filtration.

an alternative form is often encountered: in an alternative form, the injection is directly carried out not into a tank but in line, into a conduit. Gaseous (or liquid) $CO_2$ is injected into the effluent, after pumping, via a means which ranges from the simplest (for example a simple emerging pipe) to the most sophisticated (there are many gas-liquid contactors commercially available for improving the dissolution, such as static mixers, venturis or the like). The particles are then formed directly in the stream, a stream which it remains, normally, only to separate from the liquid (filtration, settling tank, and the like).

However, unfortunately, as has been signposted, the direct addition of the acid ($CO_2$) to a very basic body of water highly laden with aluminate brings about an instantaneous precipitation which is difficult to control. Virtually generally, when the body of water is highly laden in dissolved aluminum, the acidification very frequently causes massive blockages, so frequent that:

for this reason, often, for in-line treatments, the pipelines are duplicated in order to make it possible to continue to operate on one line while the other is cleaned with strong acids, optionally under high pressure. The operating costs and the maintenance are then prohibitive.

and for treatments in stirred vessels, the operating mode is often batchwise, that is to say that the feeding and the treatment are limited in duration, here also in order to make possible cleaning.

It may be emphasized that the deposits thus produced are difficult, indeed even very difficult, to remove and that both a chemical action (strong concentrated acid) and a mechanical action (scraping, high-pressure jet, and the like) are often necessary in order to succeed in eliminating the layer of deposit. This is all the more difficult in closed processes, such as conduits.

It may be possible to think, in order to overcome the abovementioned disadvantages, of a first solution consisting in dispersing the $CO_2$ as much as possible at the inlet of the clarifier-settler, for example by injecting the $CO_2$ stream at the center of the clarifier at one or more injection points.

Nevertheless, this solution exhibits several disadvantages:

the most difficult situation exists locally around each injector since the pure $CO_2$ is added directly to the effluent, which brings about precipitation, even at the injection point. Optionally, it is necessary to replace as much as possible the liquid around the injectors but this remains problematic in a stirred vessel.

the rate of transfer, that is to say the dissolution of the $CO_2$, may be limited. This is because it is difficult to have a stirred vessel which keeps the bubbles, whatever happens, in the liquid for enough time for the dissolution to be virtually complete. Bubbles can coalesce, rise quickly, independently of the desired liquid circulation, which makes them emerge without having had the time to be consumed. The phenomenon will be more marked if the stirring means are not high-performance ones and it will be critical when the bulk density of the solution will increase. This is because, in concentrated solution, the aluminates can polymerize (inorganic polymerization), trapping particles, and the like, which will bring about a strong increase in the viscosity. It will then be very difficult to maintain good stirring, very difficult to have a gas-liquid interface, which will harm the level of dissolution (thus a total interface related to the fine size of the bubbles and thus to their large number), as well as prevent blocking (the holes, which become blocked, will distort the injected streams, and the like).

finally, a large amount of $CO_2$ will not be dissolved and will be released into the headspace of the stirred reactor. As $CO_2$ is toxic, it will be necessary to manage it: addition of a capping, addition of detector, bleeding and thus loss of a part of the $CO_2$ introduced, and the like.

A second solution was then provided in the literature, consisting in preventing direct contact, this being achieved by using a body of water, often clean (on-site industrial network, for example), carbonated beforehand. Thus, beforehand, the $CO_2$ is injected into an industrial clean water (not an effluent). This "roundabout" means for adding $CO_2$ is similar to the manufacture of seltzer water.

A large amount of $CO_2$ is dissolved. Subsequently only, this "driving" water containing a desired amount of dissolved $CO_2$ is mixed with the effluent to be treated in a pH zone such that aluminum hydroxide is preferably formed, which, not being very soluble, precipitates in the stirred vessel (in combination with a downstream separation means) or directly within a clarifier or settler.

Nevertheless, this solution exhibits the following disadvantage: water is consumed, with an associated cost and an unfavorable environmental footprint because the total liquid flow rate is increased, which will have to be treated on the settler by diluting the effluent.

SUMMARY

As will be seen in greater detail in what follows, the present invention then endeavors to provide a novel solution for the treatment of such aluminum-rich effluents which makes possible the optimum use of the $CO_2$.

For this, the acidification using a weak diacid, such as $CO_2$ (and not a strong acid, such as sulfuric acid, for example) exhibits several advantages:

better control of the target pH in order to carry out the precipitation.

the consumption of $CO_2$, which can be recovered as a manufacturing or combustion byproduct (the term "inevitable" $CO_2$ is then used).

the formation of solid, such as aluminum hydroxide. This is because the latter is virtually insoluble, which guarantees good effectiveness in the precipitation process.

The solution provided according to the present invention then rests on the separation of the process into two distinct phases, in two distinct zones:

the first phase: during which the aim is to carry out the generation of crystals in the form of predominantly aluminum hydroxide. The conditions which prevail therein, in particular a low pH (preferentially from 5 to 8.5), are favorable thereto and under no circumstances will a direct injection of $CO_2$ be carried out in this zone because it would bring about the shortcomings of the prior art as touched on above.

This zone "1" can be a tank, a zone in which the very alkaline and aluminum-rich effluent arrives (for example at a pH of the order of 12.5).

It is then arranged, as will be explained in more detail below, to have available, in this zone, sufficient dissolved $CO_2$ for the effluent in this zone to change from an alkaline pH to a pH preferentially of less than 9.5 and more preferentially located between 6.5 and 8.5 in all the scenarios. This is because, if the flow rate of effluent to be treated is variable, the amount of compounds to be neutralized is variable and it is thus necessary to avoid, during a peak in amount (concentration and/or flow rate), being in a situation of not having enough dissolved $CO_2$ to neutralize it. By this reduction in pH, the dissolved form of the aluminum (aluminate) will change to the aluminum hydroxide form and will precipitate.

To sum up, the formation of the solid which can be furring takes place in the zone 1 and thus, if the solid is furring at the time of its formation, the problem appears in this first zone, which has to contain sufficient dissolved $CO_2$ to "neutralize" the crude effluent which arrives.

A second phase (second zone): in which the aim is to carry out the injection and the optimized maximized dissolution of the $CO_2$ while very greatly limiting, indeed even while nullifying, any phenomenon of precipitation, more precisely of generation of aluminum oxide crystals.

To do this, it is proposed, according to the present invention, for the second zone, which can be called "zone of dissolution of the $CO_2$", to be able:

to make it possible to withdraw a part of the pretreated effluent, that is to say which no longer contains or virtually no longer contains electrolyte to be precipitated, thus aluminate (aluminum in the dissolved form). This stream is thus diverted from a part of the effluent exiting from this zone 2, thus from the complete process. In the absence of dissolved aluminum (or in a very small amount), it is then possible to inject $CO_2$ in this bypass/recirculation without bringing about significant precipitation since there is no longer any of it or virtually none of it.

$CO_2$ is thus injected into this withdrawn sample while maximizing the mass transfer of the gas to the liquid. This is guaranteed by the hydraulic conditions (turbulent conditions, if possible), a temperature which is the lowest if possible (preferentially from 5 to 45° C. and more preferentially still between 15 and 30° C.), a pressure which is the highest possible (preferentially between 1.5 bar and 20 bar and more preferentially still between 2 and 4 bar, but which remains reasonable for operational cost reasons; a pressure of less than 10 bar is thus favored) and a mixing time during which the gas and the liquid remain in contact for a sufficiently long time (between 3 and 30 seconds, preferentially between 5 and 15 seconds, of contact is thus favored).

in other words, the zone 2 is used to dissolve the $CO_2$ in a stream of liquid which is pumped from the zone 1 and which is returned to this zone 1. This zone is calculated in order to dissolve sufficient $CO_2$ to lower the pH of the zone 1 from the incoming value of the alkaline effluent (for example 12.5) to the desired set value (for example 8).

In this zone 2, there is no reduction from a highly alkaline pH (such as 12.5) to a neutral or acid value but fluid is pumped from the zone 1, thus close to neutrality, in order to acidify it even more. There is thus no formation of solid in this zone 1 (or trivially) and thus the risk of plugging is eliminated or thus very significantly reduced.

the pH of the tank/zone 1 is thus ensured by calculating, for a given flow rate and a given initial pH, the amount of $CO_2$ which has to be dissolved in the zone 2 (recirculation loop) in order to achieve the desired pH in the zone 1, with very obviously a margin of safety.

the proportioning is centered on the combination of a gas-liquid ratio (generally of between 0.1 and 5 $Sm^3$ of gas per $m^3$ of liquid, preferentially 0.1 and 1 $Sm^3$ of gas per $m^3$ of liquid), of the pressure in this zone and of a flow rate of withdrawn effluent which will make it possible to dissolve all the $CO_2$ necessary for the maintenance of the desired operating conditions, in particular of the pH in the zone 1 in which initial effluent arrives, generally continuously.

the solution will in particular comprise a pump, a gas-liquid contactor (for example a static mixer), a conduit of correct size for remaining under turbulent conditions and with a length sufficient to guarantee the desired residence time (and thus the contact time), for example a contact time in the vicinity of 10 seconds.

as the dissolution is carried out in large part in this zone 2, the carbonated effluent can be returned to the first zone. It thus contains essentially $CO_2$ in dissolved form, namely $CO_2$ and bicarbonate $HCO_3^-$, and thus hardly any gas, if the operating conditions have been observed (level of transfer of greater than 80%, indeed even 90%). The operating conditions are thus maintained in order to guarantee these dissolved forms, namely, in general, a low pH (less than 8 to 9), preferentially not falling below 5.

To sum up, the zone 1 must make possible:

first of all, the most intimate possible mixing between the incoming fresh effluent (laden in aluminate) and the diverted stream which was carbonated in the zone 2 and which is returned to the zone 1 (laden with enough dissolved $CO_2$, in the $HCO_3^-$ and in particular $CO_2$ form, to guarantee the target precipitation pH in the zone 1). This will make it possible to maximize the production of solid/precipitates. The mixture will then be constituted of liquid freed from a large part of its aluminum and solid particles.

likewise, in order to properly control and guarantee the precipitation in all scenarios, that is to say even if the incoming effluent changes in quality (more or less alkali which results from the changing product flow rate by concentration of alkali), it is preferable to provide 1.5 to 2 times more dissolved $CO_2$ in the zone 1 than necessary to neutralize all the mean incoming effluent (stoichiometric requirement for dissolved $CO_2$ to achieve the target pH value for precipitating the maximum of dissolved aluminum). Thus, any peak in demand (thus peak in alkalinity of the incoming effluent) will be properly neutralized by the dissolved $CO_2$ present in the zone 1. To sum up, the zone 1 is proportioned in order to guarantee a desired target pH/volume pair.

These zones 1 and 2 will thus, for example, be constituted:

for the zone 1, of a vessel which contains a stirred part, making possible good mixing of the liquid streams (fresh effluent to be treated and return originating from the zone 2) and good precipitation (no strong shearing by the stirrer(s), sufficient residence time if it operates in batchwise, semi-continuous or continuous mode), even partial separation by settling (via a zone protected by a deflector, for example), in order to be able to extract a part of the effluent treated in this vessel and to send it to the zone 2 (recirculation pipeline). After treatment, the liquid and solid mixture can be separated by settling directly in the vessel (batchwise operation with regard to a stirred vessel) or else be separated by settling downstream.

for the zone 2, for example of a recirculation loop mounted on the plant of the zone 1, namely a pump which sends the stream to a gas-liquid contactor (static mixer) which makes it possible to inject and to thoroughly mix the gas-$CO_2$ and the liquid in order to promote the dissolution of the $CO_2$ and then finally enough length of conduit to guarantee a sufficient residence time to promote, here also, the dissolution before the return of the water, thus carbonated, to the zone 1. Its proportioning is based essentially on the gas-liquid ratio, the amount of $CO_2$ necessary to precipitate what is desired (generally virtually all) the aluminum contained in the fresh effluent to be treated and the solubility of the $CO_2$ in the effluent. The total volume of the zone 2 is thus not critical here.

It is the entirety of this optimized implementation (in particular without driving water), especially for aqueous effluents or solutions very highly concentrated in electrolyte (predominantly in aluminum), which is noteworthy in the present proposal.

BRIEF DESCRIPTION OF THE DRAWING

For a further understanding of the nature and objects for the present invention, reference should be made to the following detailed description, taken in conjunction with the accompanying drawings, in which like elements are given the same or analogous reference numbers and wherein:

FIG. 1 illustrates a system for treating an industrial effluent charged with aluminium using $CO_2$.

DETAILED DESCRIPTION OF PREFERRED EMBODIMENTS

Let us illustrate the invention in what follows by an implementational example and by the appended FIG. 1, for a better understanding of the approach of the invention.

Let us consider an effluent, at a flow rate of 30 m³/h with an initial pH of 12, which it is desired to lower to 8.2 in order to be able to discharge it to a network while having precipitated beforehand the aluminum salts which it contains.

It is thus necessary to employ, in terms of $CO_2$, of the order of 600 g/l×30=18 kg/h de $CO_2$.

In the implementation proposed, the effluent arrives in the center of the neutralization tank where good homogeneity is provided, which tank is equipped with a stirring system, optionally supplemented by an additional stirrer if that which is already in place is not sufficient.

The recirculation loop thus has to contribute, in dissolved form, at least 18 kg/h of $CO_2$.

As the temperature of the effluent is in the vicinity of 25° C., the solubility is of the order of 1.4 kg $CO_2$/m³ at 1 bar abs.

As the loop operates at an absolute pressure of 2 bar, the enriching flow rate has to be in the vicinity of 6.5 m³/h.

A person skilled in the art understands that he will have to incorporate a margin and will then retain instead a loop flow rate of the order of 10 m³/h.

It is thus a matter of treating a furring/scaling effluent, containing a great deal of dissolved aluminum to be removed The initial high-pH effluent ($pH_1$ in the vicinity of 12) is sent to a tank which is maintained at a lower pH ($pH_2$ in the vicinity of 8-8.4). This is the target value chosen according to the invention in this case for precipitating the aluminum hydroxides.

The neutralized effluent with its solid exits via the bottom (pumped) in order to be subsequently separated by settling (filtration).

A part of the contents of the tank at pH2 is pumped by the external loop (zone 2) into which the $CO_2$ is injected via an injector (for example a static mixer); this effluent was freed in the tank from the great majority of its dissolved minerals; it is thus consequently much more weakly scaling.

Turbulent conditions are maintained throughout the loop. There is then achieved, under pressure generated by the pump, a pH ($pH_3$) even closer to neutrality or to acidity ($pH_3<pH_2<pH_1$), which pH guarantees the predominant formation of hydrogencarbonate and the presence of dissolved $CO_2$.

The gas-liquid mixture is then sent to a coil, the length of which makes it possible to guarantee a sufficient contact time to maximize the amount of $CO_2$ transferred into the stream.

Finally, this acidified stream at $pH_3$ is returned to the tank where, at the closest to the incoming stream at $pH_1$, it will be mixed to guarantee the $pH_2$ which prevails in the tank, which $pH_2$ is optimum for the formation of aluminum hydroxide crystals.

It should be noted that, in this case, the more the pH falls, the more the precipitation is promoted, down to a limiting pH of 5.

It should thus be noted, to sum up, that:

The incoming effluent, at high pH (10-12), is predominantly composed of dissolved aluminum in the $Al(OH)_4^-$ form.

In order to free it of as much dissolved aluminum as possible, it is advantageous to operate between 5.5 and 8 approximately, there where a large part of the aluminum is transformed into the $Al(OH)_3$ form, which is not very soluble.

It is virtually impossible, with $CO_2$, to have a lower pH than 5-5.5 and to redissolve the aluminum hydroxide particles which would have been formed. $CO_2$ is a weak diacid, the first pKa of which does not make it possible to fall below approximately 5.

The effluent, after having been treated and thus freed from a large amount of dissolved aluminum, can absorb $CO_2$ (part of the stream diverted between the zones 1 and 2). Nevertheless, it is preferable to operate in the top part of the targeted zone (rather towards 8 than towards 5 thus) in order to have more dissolved $CO_2$ (better solubility of the $CO_2$ at high pH than at low pH because the hydrogencarbonate $HCO_3^-$ form rather than free $CO_2$ is favored).

The following elements, already touched on several occasions in the above description, are recognized in the appended FIG. 1:

a tank 1 constituting the zone 1, equipped with a stirring system 33 and fed with initial effluent to be treated 4;

a recirculation loop 10 constituting the zone 2, capable of withdrawing (5) a part of the medium present in the tank 1 by virtue of a pump 9, which loop receives an injection of $CO_2$ and which is equipped with a coil, the length of which makes it possible to guarantee a contact time sufficient to maximize the amount of $CO_2$ transferred into the stream;

at the end of the loop 10, the stream thus treated is returned to the tank 1, thus contributing, by the mixing between the initial effluent (4) and the medium treated with $CO_2$ in the loop 10, to producing the target pH prevailing in the tank 1;

the tank is equipped with means (6) for extraction of the treated effluent.

The advantages of the present solution are as follows:

Of avoiding the consumption of water of industrial type to produce a seltzer water as in the conventional solution of the prior art.

Of always preventing any precipitation in the zone where the $CO_2$ will be injected. The precipitation zone 1 (reactor, settler, and the like) always has to be maintained at a lower pH than that of the incoming stream to be treated in order to make possible the precipitation of the aluminum in the aluminum hydroxide form (in the vicinity of pH 8, for example). The incoming effluent to be treated is then diluted in the zone 1, which should result in a slight increase in the pH, which will in fact be compensated for by the injection of $CO_2$ in zone 2, namely the recirculation loop. An attempt is made to provide an amount of dissolved $CO_2$ greater than the mean requirement (1.5 to 2, for example) by the choice of the reliable volume of zone 1 and target pH pair.

Of guaranteeing a rate of transfer of the $CO_2$ which is maximized, which results from the choice of the operating conditions and of the technologies in the recirculation loop (turbulence). This will result in a consumption which is as close as possible to the requirement of the system (no overconsumption).

The zone 2 is used only to dissolve the $CO_2$ in a stream of water (effluent) which is pumped from the zone 1 and which is returned to this zone 1. This zone is calculated in order to dissolve sufficient $CO_2$ to lower the pH of the zone 1 from the incoming value of the alkaline effluent example 12.5 to the set value example 8. It is also possible to use this zone to introduce a part of the $CO_2$ in the gas form (fine bubbles) from the zone 1 to 2.

In this zone 2, there is no reduction from a highly alkaline pH (12.5) to a neutral or acid value but the effluent is pumped from the zone 1, thus neutral or acid, in order to acidify it even more. There is thus no formation of solid in this zone 1 (or trivially) and thus the risk of plugging is thus reduced. It is even possible, if even more $CO_2$ is injected and this zone is acidified even more, to dissolve the aluminum solids formed at neutral pH and optionally to declog this zone 1 even if in theory this is not necessary.

As indicated above, particular attention is paid, according to the present invention, in view of the recirculation of the medium where $CO_2$ has been injected, to the amount of dissolved $CO_2$ available in the zone 1 being 0.5 to 3 times greater, preferentially between 1 and 1.5 times greater, than the requirement necessary for the precipitation of the incoming effluent.

Let us explain this in more detail in what follows.

Let us explain in particular how to determine the $CO_2$ requirement of a tank (zone 1) and an example of calculation for an amount of available dissolved $CO_2$ which is from 0.5 to 3 times greater than the $CO_2$ requirement necessary for the precipitation in the zone 1.

The effluent entering the zone 1 is very alkaline (thus high pH 1 and high concentration of dissolved aluminum). That is where it will be brought into contact with the effluent, the pH of which has been lowered to a $3^{rd}$ pH, containing the necessary dissolved $CO_2$ coming from the zone 2 (low pH 2 since the effluent will contain at least all the $CO_2$ necessary for the precipitation). On contact of the two, the dissolved $CO_2$ will make it possible to neutralize the alkalis of the incoming effluent and thus to reduce the pH in order to make possible the precipitation and thus to free this effluent from its dissolved aluminum. The resulting pH, pH 3, will be between the two preceding pH values, and is adjusted so as to favor the precipitation.

In continuous running, the necessary amount of $CO_2$ introduced (thus of weak diacid) compensates as much as possible for the alkalinity of the incoming effluent (thus stoichiometric ratio of acid to alkali or base). Nevertheless, if there is a sudden modification to operating conditions and if the amount of alkali increases, an imbalance is created in the acid-base ratio which has to be compensated for. The phenomenon may then be achieved that the effluent which circulates continuously in the zone 2 can have extra alkali which will bring about the precipitation in this zone. This can even obstruct the complete system by blocking, often very rapid in numerous applications, given the high alkalinity of the effluent to be treated. Of course, a control-regulation system might adjust the amount of $CO_2$ to the amount of alkali (which must cause the pH of the precipitation zone 1 to fall) but this remains problematic. This is because the amounts involved (size of the zone 1) can bring about a slow change in the operating parameters: with a high and sudden incoming amount of alkali, the pH of the zone 1 will change only slowly if the amount is large in size (and thus with a high residence time). Thus, the amount of $CO_2$ will not respond immediately, indeed even excessively late, which can bring about an undesirable rapid and strong precipitation in the zone 2, which phenomenon absolutely has to be avoided at the risk of stopping everything by an excessively massive blocking.

The reasoning of the present invention is thus to retain a greater amount than rendered necessary by the incoming effluent of free dissolved $CO_2$ available in the zone 1 where the precipitation takes place.

Thus, if there is a variation in the operating conditions (amount of incoming alkali, for example), this extra dissolved $CO_2$, with respect to the amount of $CO_2$ necessary for the precipitation (thus stoichiometric), will make it possible to "neutralize" this extra amount in a given period of time. This will, in any case, prevent dissolved aluminum or alkali being sent into the zone 2 and will allow the control-regulation system the time to adjust the flow rate of $CO_2$ to be injected in order to compensate for this additional amount.

It is estimated, according to the present invention, that an excess of dissolved, and thus available, $CO_2$ of the order of 0.5 to 3 times the amount necessary for the optimized neutralization and thus for the optimized precipitation of the incoming effluent is necessary.

The example below makes it possible to more clearly illustrate the proposal of the invention.

The data below were obtained by using commercially available software, making it possible to study the equilibria in a body of water. The simulation was carried out in several stages: starting from a (standard) water composition, the addition of sodium hydroxide made it possible to rise to pH 12. This makes it possible to have available a "synthetic" effluent. For this, it was necessary to add 0.56 kg/m³ of sodium hydroxide.

Subsequently, the addition of $CO_2$ made it possible to neutralize it to pH 8 first and then 7.5. It is the effluent neutralized to 8 which was subsequently stored for example. In order to neutralize the effluent from 12.0 to 8.0, it was necessary to add 0.60 g/m³ of $CO_2$, which leaves 18 g/m³ of free $CO_2$ in the effluent.

Consequently, for an effluent flow rate of 100 m³/h, 1 kg/min of $CO_2$ will be necessary in order to neutralize it.

Furthermore, if the tank (or zone 1) measures 55 m³, it will contain only 1 kg of free $CO_2$, thus available to compensate for an excess of alkalinity suddenly arriving. This would make it possible to compensate for one minute for the arrival of effluent, in the event of shutdown of the injection of $CO_2$, for example, or else to compensate for a rise in the amount of alkali (for example, from 1 kg/min of requirement to 1.5, for example). In the latter case, in 40 seconds, the free $CO_2$ will be consumed and the pH will subsequently rise, the reactor or zone 1 will no longer precipitate all the incoming alkali and the entire process will be destabilized. Eventually, dissolved alkali will enter the zone 2, which might result in precipitation and in blockage.

It is thus preferable to increase the volume of the zone 1 so as to have more free $CO_2$ available for "erasing" or neutralizing the fluctuations or disruptions in the incoming effluent, inter alia.

Still in the above case, with a zone 1 of 166 m³, 3 kg of free $CO_2$ will be available to neutralize an extra incoming alkalinity. If this excess brings about a requirement for $CO_2$ of 1.5 kg/min, the system will drift only after 2 minutes. Thus, still in this example, the reaction time necessary to compensate for the sudden excess in alkalinity will have been multiplied by 5. There thus exists much more flexibility and robustness for the process since the complete system is allowed the time to be controlled and to be regulated.

To sum up, the zone 1 is established in order for this zone to contain a minimum of 1.5 times to 3 times the amount of $CO_2$ necessary to neutralize the alkalis which arrive each minute in the zone and thus to make possible the precipitation of virtually all of the aluminum (its oxides) in this zone 1. The amount of free $CO_2$ in the zone can be brought above 3, but without exceeding 10 or 15 for economic reasons.

In our example, the free $CO_2$ is 18 $g/m^3$ for a set pH of 8 and 57 $g/m^3$ for a set pH of 7.5.

In order to determine the volume of the zone 1 and to calculate the amount of free $CO_2$ available, the amount in kg of free $CO_2$ needed is divided by the concentration of free $CO_2$ in the effluent at the set pH.

Thus: Volume of the zone 1=amount of $CO_2$ in kg which has been determined/concentration of free $CO_2$ at the set pH.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A process for the treatment of an industrial effluent with aluminum for the purpose of removing all or part of the aluminum therefrom, comprising:

carrying the effluent to be treated to a first zone, where a pH of less than 9.5 is maintained in the first zone, so as to promote precipitation of the aluminum in an aluminum hydroxide form and to thus facilitate its removal;

providing a second zone, a recirculation of a part of the effluent located in the first zone to the second zone and then, from there, to the first zone, and an injection of gaseous $CO_2$ into the recirculated effluent, are arranged;

separating and discharging solid particles formed in the first zone;

wherein, during the injection of gaseous $CO_2$ into the recirculation effluent, the amount of dissolved $CO_2$ available in the first zone is 0.5 to 3 times greater than the requirement necessary for the precipitation of an incoming effluent, wherein, during the injection of gaseous $CO_2$ into the recirculation effluent, a sufficient residence time of $CO_2$ is promoted with a pressure between 1.5 bar and 20 bar and a temperature ranging from 5 to 45° C. in the recirculation of the part of the effluent.

2. The process as claimed in claim 1, wherein the conditions prevailing in the second zone are turbulent conditions.

3. The process of claim 1, wherein the first zone is a tank.

4. The process of claim 1, wherein a pH of between 6.5 and 8.5 is maintained in the first zone.

5. The process of claim 1, wherein a pH of between 7 and 8 is maintained in the first zone.

6. The process of claim 1, wherein the amount of dissolved $CO_2$ available in the first zone is between 1 and 1.5 times greater than the requirement necessary for the precipitation of the incoming effluent.

7. The process of claim 1, wherein the sufficient residence time of $CO_2$ is between 3 and 30 seconds.

8. The process of claim 1, wherein the sufficient residence time of $CO_2$ is between 5 and 15 seconds.

9. The process of claim 1, wherein the pressure is between 2 and 4 bar.

10. The process of claim 1, wherein the pressure is less than 10 bar.

11. The process of claim 1, wherein the temperature ranges from 15 to 30° C.

* * * * *